United States Patent
Wang et al.

(10) Patent No.: US 11,990,758 B2
(45) Date of Patent: May 21, 2024

(54) CONTROL METHOD, AUXILIARY POWER SUPPLY OF PHOTOVOLTAIC INVERTER AND PHOTOVOLTAIC POWER GENERATION SYSTEM

(71) Applicant: Delta Electronics (Shanghai) Co., Ltd., Shanghai (CN)

(72) Inventors: Yuxi Wang, Shanghai (CN); Xuancai Zhu, Shanghai (CN); Bingwen Weng, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 273 days.

(21) Appl. No.: 17/457,253

(22) Filed: Dec. 1, 2021

(65) Prior Publication Data

US 2022/0181884 A1 Jun. 9, 2022

(30) Foreign Application Priority Data

Dec. 3, 2020 (CN) .......................... 202011400442.7

(51) Int. Cl.
*H02M 1/36* (2007.01)
*H02J 3/00* (2006.01)
*H02J 3/38* (2006.01)
*H02S 40/32* (2014.01)
*H02M 1/00* (2006.01)

(52) U.S. Cl.
CPC .............. *H02J 3/381* (2013.01); *H02J 3/007* (2020.01); *H02M 1/36* (2013.01); *H02S 40/32* (2014.12); *H02J 2300/26* (2020.01); *H02M 1/0006* (2021.05)

(58) Field of Classification Search
CPC ........ H02M 1/36; H02M 1/0006; H02J 3/381; H02J 3/007; H02J 2300/26; H02S 40/32
See application file for complete search history.

(56) References Cited

U.S. PATENT DOCUMENTS

2015/0295512 A1* 10/2015 Danmayr ................ H02M 1/36
307/52

FOREIGN PATENT DOCUMENTS

| CN | 101860266 A | 10/2010 |
|---|---|---|
| CN | 102315764 A | 1/2012 |
| CN | 102624086 A | 8/2012 |
| CN | 202395652 U * | 8/2012 |

(Continued)

*Primary Examiner* — Harry R Behm
(74) *Attorney, Agent, or Firm* — CKC & Partners Co., LLC

(57) ABSTRACT

The present application provides a control method, an auxiliary power supply of a photovoltaic inverter, and a photovoltaic power generation system. The auxiliary power supply includes a rectifier circuit and a conversion circuit with at least one output terminal. The conversion circuit includes a voltage determining unit and a power determining unit. The conversion circuit is coupled to an output terminal of the rectifier circuit, and is configured to convert direct current power into at least one auxiliary voltage. The power determining unit and the voltage determining unit are coupled to an input terminal of the inverter circuit or an input terminal of the photovoltaic inverter, which are configured to obtain output power and an output voltage of the solar panel, respectively. When the output voltage is greater than the start-up voltage and the output power is greater than the start-up power, the auxiliary power supply starts.

17 Claims, 5 Drawing Sheets

(56) References Cited

FOREIGN PATENT DOCUMENTS

| CN | 103715713 A | 4/2014 |
| CN | 106059280 A | 10/2016 |
| CN | 206686099 U | 11/2017 |

* cited by examiner

US 11,990,758 B2

CONTROL METHOD, AUXILIARY POWER SUPPLY OF PHOTOVOLTAIC INVERTER AND PHOTOVOLTAIC POWER GENERATION SYSTEM

CROSS-REFERENCE TO RELATED APPLICATIONS

This application claims priority to Chinese Patent Application No. 202011400442.7, which was filed on Dec. 3, 2020. The disclosure of the above patent application is incorporated herein by reference in its entirety.

TECHNICAL FIELD

The present application relates to the field of photovoltaic power generation technologies, and in particular, to a control method, an auxiliary power supply of a photovoltaic inverter, and a photovoltaic power generation system.

BACKGROUND

Generally, there are three ways to take power for an auxiliary power supply of a photovoltaic inverter. A first one is to take power from a direct current bus of the photovoltaic inverter, a second one is to take power from an alternating current grid, and a third one is a combination of the former two, that is, to take power from the direct current bus of the photovoltaic inverter and the alternating current grid respectively at the same time. When power is taken from the direct current bus of the photovoltaic inverter, photovoltaic inverters with different system voltages have big differences on auxiliary power supply scheme; especially when the system voltage rises to 1100V, 1500V or even higher, the implementation of the auxiliary power supply of the photovoltaic inverter will become more complicated, which will lead to a significant increase in costs, significantly reduce its efficiency, and the grid-connected efficiency and power density of the photovoltaic inverter are affected. When the output power of the solar panel is too small due to factors such as early mornings, overcast and rainy days, the auxiliary power supply of the photovoltaic inverter will restart repeatedly, which will affect the reliability of the photovoltaic inverter and user experience. When the power is taken from the alternating current grid, the photovoltaic inverter does not need to work at night because the solar panels can't output power, but the auxiliary power supply of the photovoltaic inverter still keeps working, causing unnecessary losses at night. When the above-mentioned two power-taking methods are combined, their respective shortcomings and problems still exist.

In the prior art, there have been some solutions to the above problems, such as setting a start-up circuit or unloading circuit between the photovoltaic inverter and its auxiliary power supply, or setting a new control method for the start and stop of the auxiliary power supply of the photovoltaic inverter and so on. However, for the solution of adding a corresponding control circuit, additional components for different system voltages will further increase hardware investment costs, and the technical solution cannot simultaneously solve the problems of repeated restarts of the auxiliary power supply and unnecessary losses at night, and has low adaptability.

SUMMARY

The present application provides a control method, an auxiliary power supply of a photovoltaic inverter, and a photovoltaic power generation system to solve the problems of repeated restarts of the auxiliary power supply of the photovoltaic inverter, unnecessary losses at night and low adaptability in the prior art.

In a first aspect, the present application provides an auxiliary power supply of a photovoltaic inverter, the auxiliary power supply includes: a rectifier circuit and a conversion circuit with at least one output terminal, the conversion circuit includes a voltage determining unit and a power determining unit;

an input terminal of the rectifier circuit is coupled to a power grid, and the rectifier circuit is configured to convert alternating current power of the power grid into direct current power and output the direct current power to an input terminal of the conversion circuit;

the conversion circuit is coupled to an output terminal of the rectifier circuit, and is configured to convert the direct current power into at least one auxiliary voltage;

the power determining unit is coupled to an input terminal of the photovoltaic inverter or an input terminal of an inverter circuit of the photovoltaic inverter, and is configured to obtain output power of the solar panel; the voltage determining unit is coupled to the input terminal of the photovoltaic inverter or the input terminal of the inverter circuit of the photovoltaic inverter, and is configured to obtain an output voltage of the solar panel; where, when the output voltage is greater than a start-up voltage and the output power is greater than start-up power, the auxiliary power supply is started to generate a corresponding auxiliary voltage at the at least one output terminal.

In a possible design, the voltage determining unit includes: a start-up resistor, a start-up capacitor, and a control chip;

a first terminal of the start-up resistor is coupled to a positive terminal of the input terminal of the inverter circuit or a positive terminal of the input terminal of the photovoltaic inverter, and a second terminal of the start-up resistor is coupled to a start-up terminal of the control chip, a first output terminal of the at least one output terminal and a first terminal of the start-up capacitor, respectively, and a second terminal of the start-up capacitor is grounded;

the solar panel provides an input current to the control chip through the start-up resistor, so that the voltage determining unit obtains the output voltage.

In a possible design, when the output voltage is greater than the start-up voltage and the output power is greater than the start-up power, the control chip is activated to control the auxiliary power supply to start, and a first auxiliary voltage is generated at the first output terminal to provide an operating voltage for the control chip.

In a possible design, the start-up voltage is determined according to resistance of the start-up resistor and a start-up current threshold, and the start-up current threshold is configured to represent the input current when the control chip is started.

In a possible design, the power determining unit includes: a first resistor, a second resistor, and a first switch;

a first terminal of the first resistor is coupled to the first terminal of the start-up resistor, and a second terminal of the first resistor is coupled to a first terminal of the first switch, and a second terminal of the first switch is coupled to a negative terminal of the input terminal of the inverter circuit or a negative terminal of the input terminal of the photovoltaic inverter, and a control terminal of the first switch is connected to the first terminal of the start-up capacitor through the second resistor.

In a possible design, when a voltage of the start-up capacitor is greater than a turn-on threshold voltage of the first switch, the first switch is turned on, and a voltage across the first resistor is equal to a voltage between the positive terminal and the negative terminal of the input terminal of the photovoltaic inverter or a voltage between the positive terminal and the negative terminal of the input terminal of the inverter circuit, so that the power determining unit obtains the output power.

In a possible design, the turn-on threshold voltage is less than the start-up voltage.

In a possible design, the start-up power is determined according to the start-up voltage, resistance of the first resistor, and maximum instantaneous power when the auxiliary power supply is started.

In a possible design, the power determining unit further includes a second switch;
a first terminal of the second switch is coupled to the control terminal of the first switch, and a second terminal of the second switch is coupled to the negative terminal of the input terminal of the inverter circuit or the negative terminal of the input terminal of the photovoltaic inverter;
a second output terminal of the at least one output terminal is coupled to a control terminal of the second switch;
when the output voltage is greater than the start-up voltage and the output power is greater than the start-up power, a second auxiliary voltage is generated at the second output terminal to control the second switch to be turned on.

In a possible design, the power grid is a single-phase power grid, and the rectifier circuit is coupled to two input terminals of the single-phase power grid.

In a possible design, the power grid is a three-phase power grid, and the rectifier circuit is coupled between live lines and/or a zero line of the three-phase power grid.

In a possible design, the auxiliary power supply further includes: an auxiliary power supply bus capacitor;
the auxiliary power supply bus capacitor is connected between the rectifier circuit and an input terminal of the conversion circuit.

In a possible design, capacitance of the auxiliary power supply bus capacitor satisfies the following equation:

$$\frac{1}{2} \times C_2 \times (U_{nom}^2 - U_{min}^2) \geq \frac{P_{out}}{\eta} \times T_{LVRT}$$

where $C_2$ is the capacitance of the auxiliary power supply bus capacitor, $U_{min}$ is a minimum direct current bus voltage when the auxiliary power supply is working, $U_{min}$ is a direct current bus voltage of the auxiliary power supply corresponding to a rated voltage of the power grid, and $P_{out}$ is output power of the auxiliary power supply when the photovoltaic inverter is in stable operation, $\eta$ is a lowest conversion rate of the auxiliary power supply, and $T_{LVRT}$ is duration of low voltage ride through.

In a second aspect, the present application provides a photovoltaic power generation system, including: at least one solar panel, a maximum power tracking circuit, a direct current bus capacitor, an inverter circuit, a power grid, and the auxiliary power supply of the photovoltaic inverter involved in any one of the first aspect and optional solutions;
an output terminal of the at least one solar panel is coupled to an input terminal of the maximum power tracking circuit, and an output terminal of the maximum power tracking circuit is coupled to the direct current bus capacitor, and the direct current bus capacitor is coupled between a positive terminal and a negative terminal of an input terminal of the inverter circuit through a positive direct current bus and a negative direct current bus, and an output terminal of the inverter circuit is coupled to the power grid, and the auxiliary power supply is coupled to an input terminal of the power grid and the input terminal of the inverter circuit, respectively, or the auxiliary power supply is coupled to the input terminal of the power grid and the input terminal of the maximum power tracking circuit, respectively.

In a third aspect, the present application provides a control method applied to an auxiliary power supply of a photovoltaic inverter, where the auxiliary power supply includes: a rectifier circuit and a conversion circuit with at least one output terminal; the conversion circuit includes a voltage determining unit and a power determining unit; an input terminal of the rectifier circuit is coupled to a power grid; the conversion circuit is coupled to an output terminal of the rectifier circuit, and the voltage determining unit is coupled to an input terminal of the photovoltaic inverter or an input terminal of an inverter circuit of the photovoltaic inverter, and the power determining unit is coupled to the input terminal of the photovoltaic inverter or the input terminal of the inverter circuit of the photovoltaic inverter; the method includes:
obtaining an output voltage and output power of a solar panel;
if the output voltage is greater than a start-up voltage and the output power is greater than a start-up power, controlling the auxiliary power supply to start;
obtaining alternating current power from the power grid and converting the alternating current power to direct current power; and
converting the direct current power into at least one auxiliary voltage, so that generating a corresponding auxiliary voltage at the at least one output terminal.

In a possible design, the voltage determining unit includes: a start-up resistor, a start-up capacitor, and a control chip;
a first terminal of the start-up resistor is coupled to a positive terminal of the input terminal of the inverter circuit or a positive terminal of the input terminal of the photovoltaic inverter, and a second terminal of the start-up resistor is coupled to a start-up terminal of the control chip, and a first output terminal of the at least one output terminal is coupled to a first terminal of the start-up capacitor, and a second terminal of the start-up capacitor is grounded;
the obtaining an output voltage and output power of a solar panel includes:
providing, by the solar panel, an input current to the control chip through the start-up resistor, so that the voltage determining unit obtains the output voltage.

In a possible design, the start-up voltage is determined according to resistance of the start-up resistor and a start-up current threshold, and the start-up current threshold is configured to represent the input current when the control chip is started.

In a possible design, the power determining unit includes: a first resistor, a second resistor, and a first switch;

a first terminal of the first resistor is coupled to a first terminal of the start-up resistor, and a second terminal of the first resistor is coupled to a first terminal of the first switch, and a second terminal of the first switch is coupled to a negative terminal of the input terminal of the inverter circuit or a negative terminal of the input terminal of the photovoltaic inverter, and a control terminal of the first switch is connected to the first terminal of the start-up capacitor through the second resistor;

the method further includes:

when a voltage of the start-up capacitor is greater than a turn-on threshold voltage of the first switch, controlling the first switch to be turned on and a voltage across the first resistor to be equal to a voltage between the positive terminal and the negative terminal of the input terminal of the inverter circuit, or a voltage between the positive terminal and the negative terminal of the input terminal of the photovoltaic inverter, so that the power determining unit obtains the output power, wherein the turn-on threshold voltage is less than the start-up voltage.

In a possible design, the start-up power is determined according to the start-up voltage, resistance of the first resistor, and maximum instantaneous power when the auxiliary power supply is started.

In a possible design, the power determining unit further includes a second switch;

a first terminal of the second switch is coupled to the control terminal of the first switch, and a second terminal of the second switch is coupled to the negative terminal of the input terminal of the inverter circuit or the negative terminal of the input terminal of the photovoltaic inverter;

a second output terminal of the at least one output terminal is coupled to a control terminal of the second switch;

the method further includes:

when the output voltage is greater than the start-up voltage and the output power is greater than the start-up power, controlling the control chip to start to control the auxiliary power supply to start, and generating a first auxiliary voltage at the first output terminal to provide an operating voltage for the control chip, and generating a second auxiliary voltage at the second output terminal to control the second switch to be turned on.

The present application provides a control method, an auxiliary power supply of a photovoltaic inverter, and a photovoltaic power generation system. The control method is applied to the auxiliary power supply of the photovoltaic inverter, and the photovoltaic power generation system includes the auxiliary power supply of the photovoltaic inverter. The auxiliary power supply of the photovoltaic inverter includes a rectifier circuit and a conversion circuit with at least one output terminal, and the conversion circuit includes a voltage determining unit and a power determining unit. An input terminal of the rectifier circuit is coupled to a power grid, and the rectifier circuit is configured to convert alternating current power of the power grid into direct current power and output the direct current power to an input terminal of the conversion circuit. The conversion circuit is coupled to an output terminal of the rectifier circuit and is configured to convert the direct current power into at least one auxiliary voltage. The power determining unit is coupled to an input terminal of the photovoltaic inverter or an input terminal of an inverter circuit of the photovoltaic inverter and is configured to obtain output power of a solar panel, and the voltage determining unit is coupled to the input terminal of the photovoltaic inverter or the input terminal of the inverter circuit of the photovoltaic inverter, and is configured to obtain an output voltage of the solar panel. When the output voltage is greater than a start-up voltage and the output power is greater than start-up power, the auxiliary power supply is started to generate a corresponding auxiliary voltage at the at least one output terminal to realize the normal start of the auxiliary power supply. There is no need to add additional control circuits, and it can provide auxiliary power solutions for photovoltaic inverters with different system voltages, and can avoid repeated restarts of the auxiliary power supply when the power of the solar panel is insufficient during the day, thereby improving the reliability of the photovoltaic inverter, and meanwhile, when the output voltage and output power of the solar panel are insufficient at night, that is, when the output voltage is less than the start-up voltage, or the output power is lower than the start-up power, the control chip would not be turned on to work, so the auxiliary power supply would not be started, thereby reducing the losses at night.

BRIEF DESCRIPTION OF DRAWINGS

To describe the technical solutions in embodiments of the present application or in the prior art more clearly, the following briefly introduces the accompanying drawings needed for describing the embodiments or the prior art. Apparently, the accompanying drawings in the following description illustrate merely some embodiments of the present application, and persons of ordinary skill in the art may still derive other drawings from these accompanying drawings without creative effort.

DESCRIPTION OF EMBODIMENTS

Figure 1:
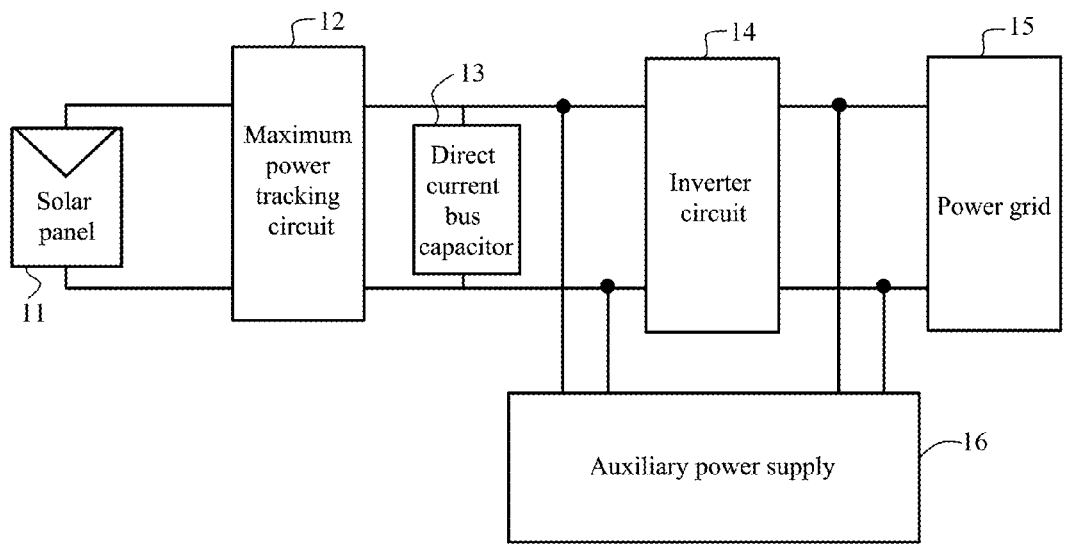
FIG. 1 is a schematic structural diagram of a photovoltaic power generation system provided in an embodiment of the present application.

The illustrative embodiments will be described in detail herein, and examples thereof are shown in the accompanying drawings. When the following description refers to the accompanying drawings, unless otherwise indicated, the same numbers in different drawings represent the same or similar elements. The implementations described in the following illustrative embodiments do not represent all implementations consistent with the present application. On the contrary, they are only examples of methods and apparatus consistent with some aspects of the application as described in the appended claims.

The terms "first", "second", "third", "fourth", etc. (if any) in the specification and claims of the present application and the above-mentioned drawings are used to distinguish similar objects, but not necessarily describing a specific order or sequence. It should be understood that the numbers used in this way can be interchanged under appropriate circumstances, so that the embodiments of the present application described herein, for example, can be implemented in a sequence other than those illustrated or described herein. In addition, the terms "input terminal" and "output terminal" may include at least one terminal. In addition, the terms "including" and "comprising" and any variations of them are intended to cover non-exclusive inclusions. For example, a process, a method, a system, a product, or a device that includes a series of steps or units is not necessarily limited to those steps or units clearly listed, but rather includes other steps or units that are not clearly listed or are inherent to the process, the method, the product, or the device.

Output power of a photovoltaic inverter is affected by factors such as light intensity and temperature. When an auxiliary power supply takes power from a direct current bus of the photovoltaic inverter, there will be a problem of repeated restarts of the auxiliary power supply. For example, when the output power of solar panels is too small in the early morning or on overcast and rainy days, the auxiliary power supply of the photovoltaic inverter will restart repeatedly, which will affect the reliability of the photovoltaic inverter and user experience. On the other hand, the solar panels do not output any power at night, and the photovoltaic inverter does not need to work, but the auxiliary power supply of the photovoltaic inverter takes power from the power grid, and the auxiliary power supply still keeps working, causing unnecessary losses at night. The prior art solves the above problems by providing a start-up circuit or unloading circuit between the photovoltaic inverter and its auxiliary power supply, or setting a new control method for the start and stop of the auxiliary power supply of the photovoltaic inverter, but on the one hand, the solutions cannot solve the problems of repeated restarts and losses at night at the same time; on the other hand, for different system voltages, adding additional components to solve the above problems will further increase hardware investment costs, resulting in lower adaptability.

In view of the problems in the existing solutions, embodiments of the present application provide a control method, an auxiliary power supply of a photovoltaic inverter, and a photovoltaic power generation system. The control method provided in the embodiment of the present application is applied to the auxiliary power supply of the photovoltaic inverter provided in the embodiment of the present application. The photovoltaic power generation system provided in the embodiment of the present application includes the auxiliary power supply of the photovoltaic inverter provided in the embodiment of the present application. The auxiliary power supply of the photovoltaic inverter includes a rectifier circuit and a conversion circuit with at least one output terminal, and the conversion circuit includes a voltage determining unit and a power determining unit. The conversion circuit is configured to convert direct current power into at least one auxiliary voltage. The voltage determining unit is configured to obtain an output voltage of a solar panel, and the power determining unit is configured to obtain output power of the solar panel. When the output voltage of the solar panel is greater than a start-up voltage, and the output power is greater than start-up power, the auxiliary power supply starts up to generate a corresponding auxiliary voltage at the at least one output terminal, so that the photovoltaic inverter can operate normally, and it will not be repeatedly restarted due to insufficient power caused by weather or other reasons. Moreover, at night, because the output voltage and output power of the solar panel are insufficient, the auxiliary power supply would not be started to work, thus reducing additional losses at night. In addition, the auxiliary power supply solution provided in the embodiments of the present application is simple and universal, and is suitable for photovoltaic inverters of different system voltages, thereby improving the adaptability of the auxiliary power supply.

Hereinafter, illustrative application scenarios of embodiments of the present application will be introduced.

FIG. 1 is a schematic structural diagram of a photovoltaic power generation system provided in an embodiment of the present application. As shown in FIG. 1, the photovoltaic power generation system provided in the present embodiment includes at least one solar panel 11, a maximum power tracking circuit 12, and a direct current bus capacitor 13, an inverter circuit 14, a power grid 15, and an auxiliary power supply 16 of a photovoltaic inverter. The photovoltaic inverter includes the maximum power tracking circuit 12, the direct current bus capacitor 13, the inverter circuit 14, and the auxiliary power supply 16 of the photovoltaic inverter.

An output terminal of the solar panel 11 is coupled to an input terminal of the maximum power tracking circuit 12, an output terminal of the maximum power tracking circuit 12 is coupled to the direct current bus capacitor 13, and the direct current bus capacitor 13 is coupled between a positive terminal and a negative terminal of an input terminal of the inverter circuit 14 through a positive direct current bus and a negative direct current bus, and an output terminal of the inverter circuit 14 is coupled to the power grid 15, and the auxiliary power supply 16 of the photovoltaic inverter is coupled to the power grid 15 and the input terminal of the inverter circuit 14, respectively, or the auxiliary power supply 16 of the photovoltaic inverter is coupled to the power grid 15 and the input terminal of the photovoltaic inverter, such as the input terminal of the maximum power tracking circuit 12, respectively. The direct current bus capacitor 13 is connected to the input terminal of the inverter circuit 14 through the positive direct current bus and the negative direct current bus. The auxiliary power supply 16 provided in the embodiment of the present application outputs at least one auxiliary voltage, realizing normal operation of the photovoltaic inverter.

It is worth noting that the power grid 15 may be a single-phase power grid or a three-phase power grid. The power grid 15 in FIG. 1 is shown as a single-phase power grid for an example. When the power grid 15 is single-phase, as shown in FIG. 1, the auxiliary power supply 16 is coupled between the two input terminals of the power grid 15.

Figure 2:
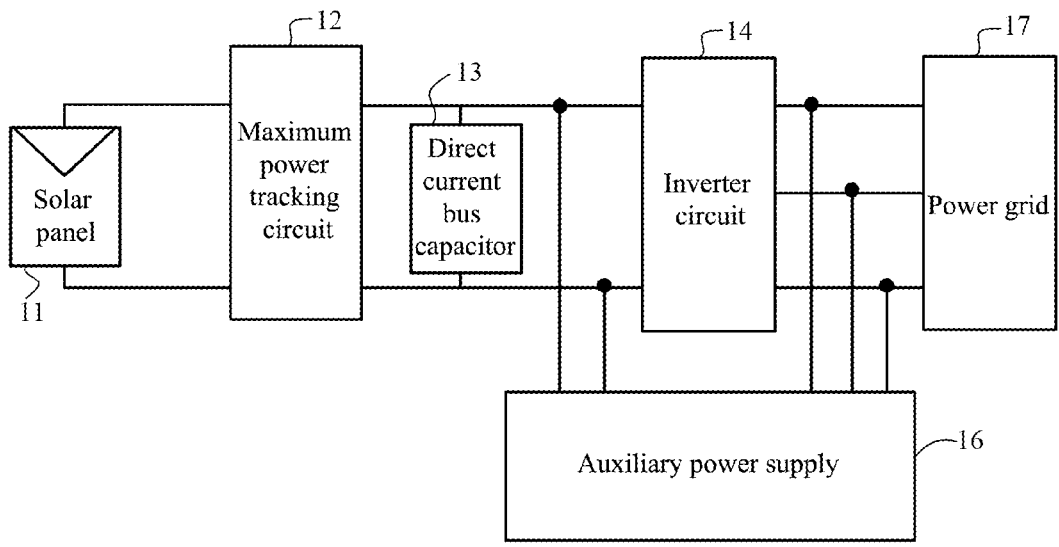
FIG. 2 is a schematic structural diagram of another photovoltaic power generation system provided in an embodiment of the present application.
Figure 3:
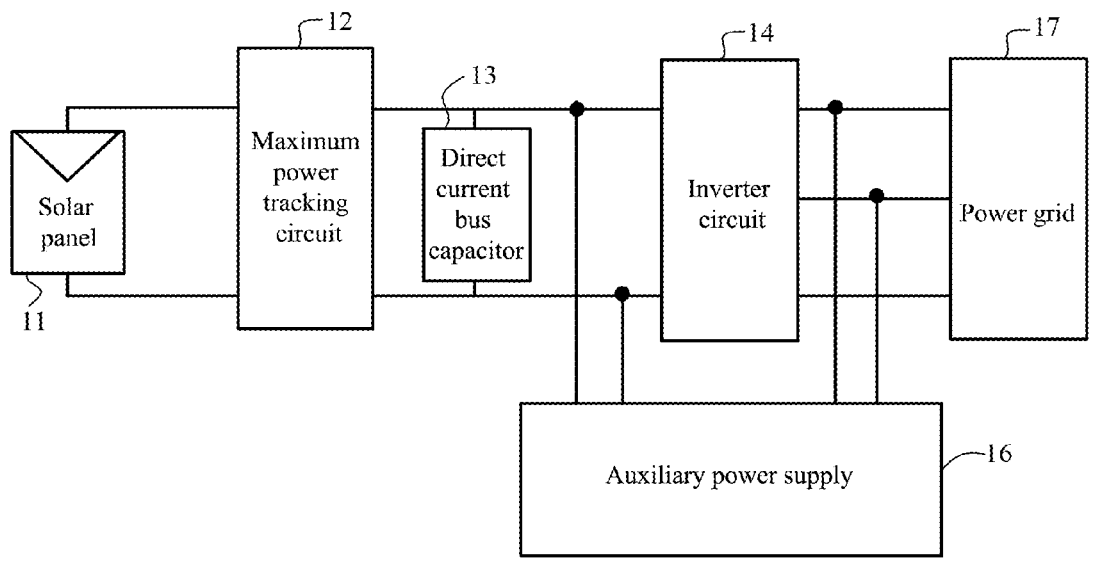
FIG. 3 is a schematic structural diagram of still another photovoltaic power generation system provided in an embodiment of the present application.
Figure 4:
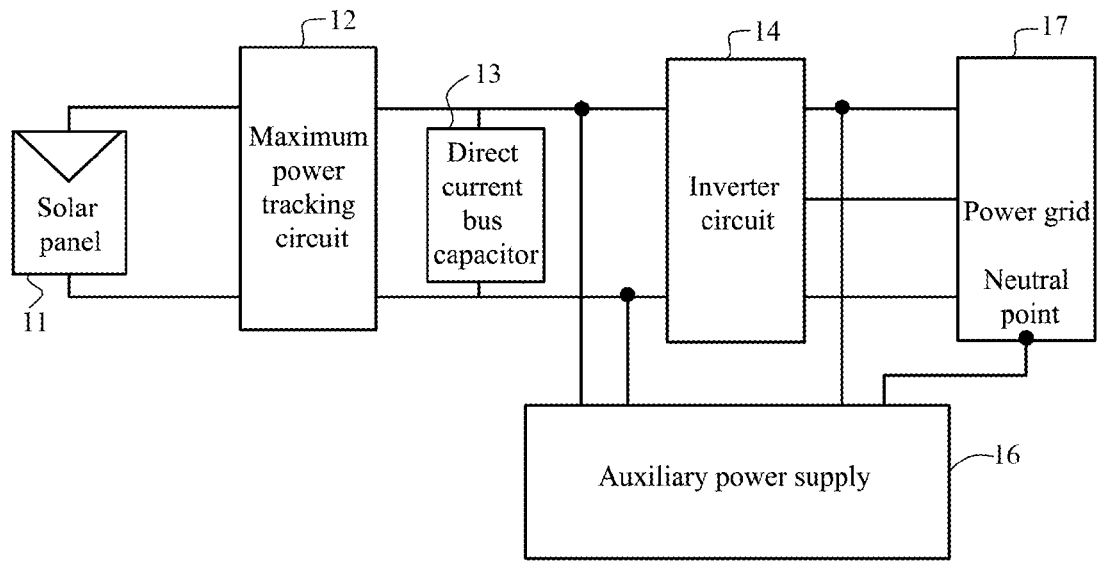
FIG. 4 is a schematic structural diagram of yet another photovoltaic power generation system provided in an embodiment of the present application.

In the case of a three-phase power grid 17, the schematic diagram of the structure of the photovoltaic power generation system may be as shown in FIG. 2 to FIG. 4. FIG. 2 is a schematic structural diagram of another photovoltaic power generation system provided in an embodiment of the present application, and FIG. 3 is a schematic structural diagram of still another photovoltaic power generation system provided in an embodiment of the present application, and FIG. 4 is a schematic structural diagram of yet another photovoltaic power generation system provided in an embodiment of the present application. As shown in FIG. 2 to FIG. 4, in the connection relationship of the components, except that the connection relationship between the auxiliary power supply 16 and the power grid changes, the other components are the same as those in the embodiment shown in FIG. 1. That is, the auxiliary power supply 16 is coupled between the live lines and/or the zero line of the three-phase power grid 17. Specifically, FIG. 2 shows a situation where the auxiliary power supply 16 is coupled to three live lines of the three-phase power grid 17. FIG. 3 shows a situation where the auxiliary power supply 16 is coupled to two live lines of the three-phase power grid 17. FIG. 4 shows a situation in which the auxiliary power supply 16 is coupled between a live line and a zero line of the three-phase power grid 17, where the zero line is drawn from the neutral point.

It is understandable that the selection of a single-phase power grid or a three-phase power grid may be determined according to an actual operating condition, which is not limited in the embodiment of the present application.

The technical solutions of the present application and how the technical solutions of the present application solve the above technical problems are described in detail below with specific embodiments. The following specific embodiments may be combined with each other, and same or similar concepts or processes may not be repeated in some embodiments. The embodiments of the present application will be described below in conjunction with the accompanying drawings.

Figure 5:
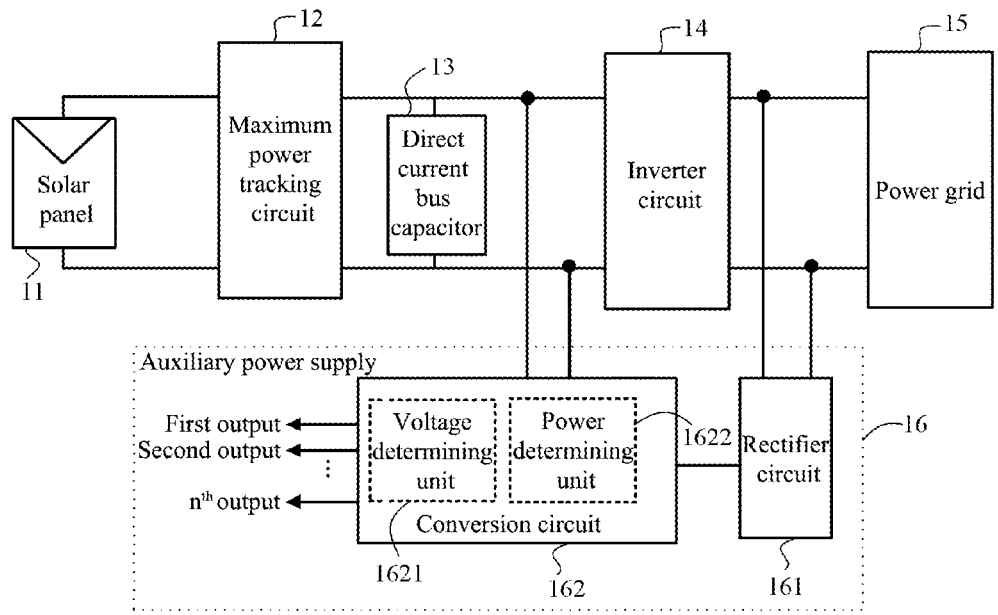
FIG. 5 is a schematic structural diagram of an auxiliary power supply of a photovoltaic inverter provided in an embodiment of the present application.

FIG. 5 is a schematic structural diagram of an auxiliary power supply of a photovoltaic inverter provided in an embodiment of the present application. For ease of the description, this figure also shows other components in the photovoltaic power generation system connected to the auxiliary power supply. The power grid in FIG. 5 is shown as a single-phase power grid for an example. As shown in FIG. 5, the auxiliary power supply 16 provided in the present embodiment includes:

a rectifier circuit 161 and a conversion circuit 162 with at least one output terminal. The conversion circuit 162 includes a voltage determining unit 1621 and a power determining unit 1622.

An input terminal of the rectifier circuit 161 is coupled to the power grid 15 and the rectifier circuit 161 is configured to convert alternating current power of the power grid 15 into direct current power and output the direct current power to an input terminal of the conversion circuit 162.

The conversion circuit 162 is coupled to an output terminal of the rectifier circuit 161 and is configured to covert the direct current power output by the rectifier circuit 161 into at least one auxiliary voltage.

The voltage determining unit 1621 is coupled to an input terminal of the photovoltaic inverter or an input terminal of the inverter circuit 14 and is configured to obtain an output voltage of a solar panel 11. The power determining unit 1622 is coupled to an input terminal of the photovoltaic inverter or an input terminal of an inverter circuit 14, and is configured to obtain output power of the solar panel 11. When the output voltage is greater than a start-up voltage and the output power is greater than start-up power, the auxiliary power supply 16 starts to work, to generate a corresponding auxiliary voltage at the at least one output terminal. In some embodiments, the voltage determining unit 1621 is configured to obtain output voltages of all solar panels 11 connected to the input terminal of the photovoltaic inverter, and the power determining unit 1622 is configured to obtain output power of all the solar panels 11 connected to the input terminal of the photovoltaic inverter.

As shown in FIG. 5, the at least one output terminal of the conversion circuit 162 is schematically represented by the first output, the second output until the $n^{th}$ output, where n is a positive natural number. In an actual operating condition, the output terminal corresponding to the at least one output terminal can be designed according to the specific situation, which is not limited in the present embodiment.

When the photovoltaic inverter starts, the inverter circuit 14 is not yet running and the photovoltaic inverter is not connected to a load. At this time, the photovoltaic inverter is in an open circuit state, that is, the output voltage of the solar panel 11 is an open-circuit voltage. As the light increases, the open-circuit voltage of the solar panel 11 increases, that is, the voltage between the positive direct current bus and the negative direct current bus increases, and the power determining unit 1622 is electrically connected to the positive direct current bus and the negative direct current bus as the load of the photovoltaic inverter, so that a current flowing path is formed between the solar panel 11 and the power determining unit 1622. The power determining unit 1622 obtains the output power of the solar panel 11 from the positive direct current bus and the negative direct current bus, and the voltage determining unit 1621 obtains the output voltage of the solar panel 11 from the positive direct current bus. As the light continues to increase, the energy output by the solar panel 11 further increases. When the output voltage is greater than the start-up voltage and the output power is greater than the start-up power, the auxiliary power supply 16 starts to work, and the rectifier circuit 161 receives the alternating current power from the power grid 15 and converts the alternating current power into the direct current power. The conversion circuit 162 converts the direct current power output by the rectifier circuit 161 into at least one auxiliary voltage and the at least one output terminal of the conversion circuit 162 generates a corresponding auxiliary voltage which is used as an operating voltage for a corresponding circuit of the photovoltaic inverter. In the embodiment, the start-up voltage and the start-up power are a start-up voltage threshold and a start-up power threshold when the auxiliary power supply 16 is started to work.

It can be understood that the open-circuit voltage described in the above embodiment is the output voltage of the solar panel 11. Accordingly, the corresponding energy output by the solar panel 11 is the output power.

Through the dual conditions of the voltage determining unit 1621 and the power determining unit 1622 in the conversion circuit 162, only when the output voltage is greater than the start-up voltage and the output power is greater than the start-up power, the auxiliary power supply 16 starts to work, thereby avoiding the repeated restarts of the solar panel 11 during the daytime when the output power gradually increases from small to large. On the other hand, because the output voltage and output power of the solar panel 11 are insufficient at night, that is, the output voltage is less than the start-up voltage of the voltage determining unit 1621 or the output power is smaller than the start-up power of the power determining unit 1622, the operating conditions for starting the auxiliary power supply of the photovoltaic inverter provided in the embodiment of the present application are not met, and therefore, the auxiliary power supply would not be started, thereby reducing the losses of the photovoltaic inverter at night. Furthermore, the operating conditions for starting the auxiliary power supply of the photovoltaic inverter provided in the embodiment of the present application do not need to take the voltage of the photovoltaic power generation system into consideration, so it has strong applicability.

It should be noted that when the power grid is a three-phase power grid, reference can be made to FIGS. 2 to 4 for the connection relationship between the auxiliary power supply 16 and the three-phase power grid 17, and the substance is that the connection relationship of the rectifier circuit 161 in the auxiliary power supply 16 and the three-phase power grid 17 changes. Relevant connection schematic diagrams are not shown in the embodiment of the present application. The auxiliary power supply of the photovoltaic inverter provided in the embodiment of the present application includes the rectifier circuit and the conversion circuit with at least one output terminal. The conversion circuit includes the voltage determining unit and the power determining unit. The input terminal of the rectifier circuit is coupled to the power grid, and the rectifier circuit is configured to convert the alternating current power of the power grid into the direct current power and output the direct current power to the input terminal of the conversion circuit. The conversion circuit is coupled to the output terminal of the rectifier circuit, and is configured to convert the direct current power into at least one auxiliary voltage. The voltage determining unit and the power determining unit are respectively configured to obtain the output voltage and output power of the solar panel. When the output voltage is greater than the start-up voltage and the output power is greater than the start-up power, the auxiliary power supply starts to work, so that a corresponding auxiliary voltage is generated at the at least one output terminal. There is no need to add additional control circuits, and the auxiliary power supply can be provided for the photovoltaic inverters with different system voltages, and can avoid repeated restarts when the power of the solar panel is insufficient during the day, which improves the reliability of the photovoltaic inverter, and meanwhile, can reduce the losses of the photovoltaic inverter at night.

Figure 6:
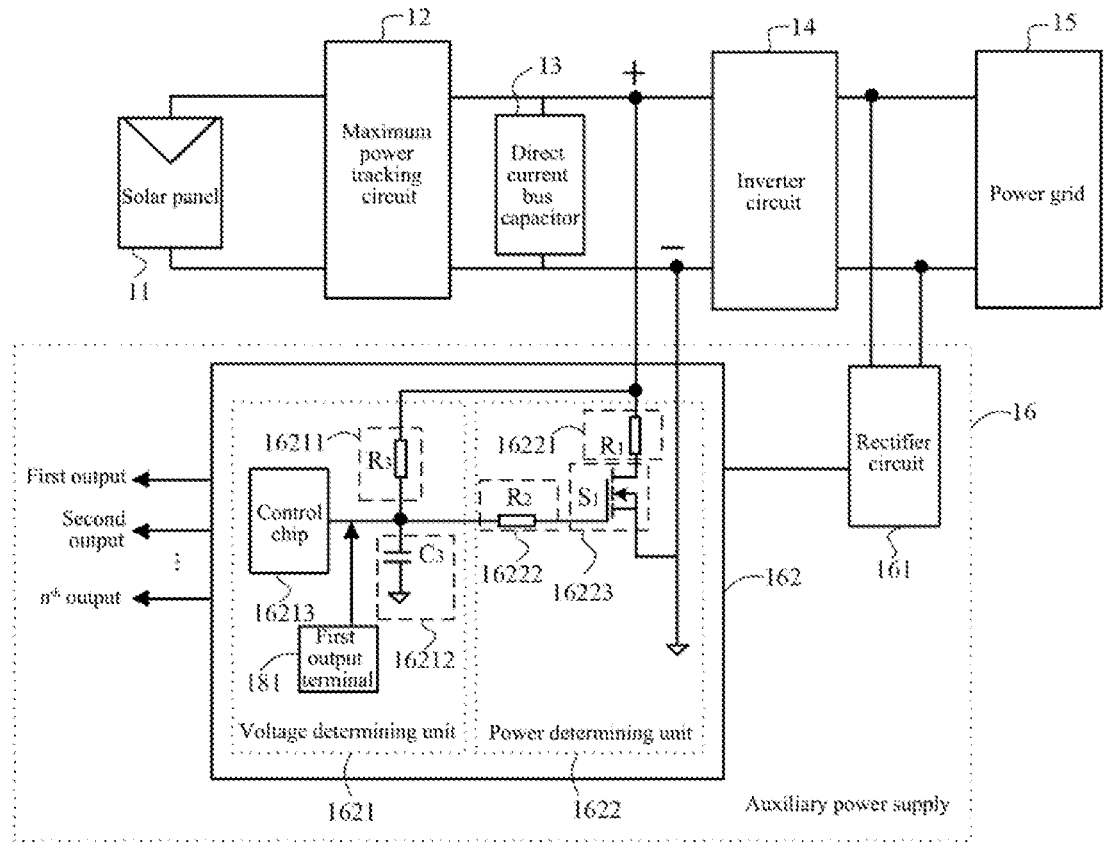
FIG. 6 is a schematic circuit diagram of an auxiliary power supply of a photovoltaic inverter provided in an embodiment of the present application.

Based on the embodiment of FIG. 5, FIG. 6 is a schematic circuit diagram of an auxiliary power supply of a photovoltaic inverter provided in an embodiment of the present application. As shown in FIG. 6, the voltage determining unit 1621 of the auxiliary power supply 16 of the photovoltaic inverter provided in the present embodiment includes a start-up resistor (R3) 16211, a start-up capacitor (C3) 16212 and a control chip 16213.

A first terminal of the start-up resistor 16211 is coupled to the positive terminal of the input terminal of the photovoltaic inverter or the positive terminal of the input terminal of the inverter circuit 14, and a second terminal of the start-up resistor 16211 is coupled to a start-up terminal of the control chip 16213, a first output terminal 181 of the at least one output terminal and a first terminal of the start-up capacitor 16212, and a second terminal of the start-up capacitor 16212 is grounded. One of the first output to the $n^{th}$ output of the conversion circuit in FIG. 6 is the first output terminal.

The solar panel 11 provides an input current to the control chip 16213 through the start-up resistor 16211 so that the voltage determining unit 1621 obtains the output voltage of the solar panel 11.

Referring to FIG. 6, the voltage determining unit 1621 includes the start-up resistor 16211, the start-up capacitor 16212, and the control chip 16213. The first terminal of the start-up resistor 16211 is coupled to the positive terminal of the input terminal of the photovoltaic inverter or the positive terminal of the input terminal of the inverter circuit 14, and the second terminal of the start-up resistor 16211 is coupled to the first terminal of the start-up capacitor 16212, the first output terminal 181 of the at least one output terminal and the start-up terminal of the control chip 16213, and the second terminal of the start-up capacitor 16212 is grounded. When the solar panel 11 has output power, the corresponding output voltage is the voltage between the positive terminal and the negative terminal of the input terminal of the photovoltaic inverter or the voltage between the positive terminal and the negative terminal of the input terminal of the inverter circuit 14. The solar panel 11 provides the input current to the control chip 1613 through the start-up resistor 16211, so that the output voltage of the solar panel 11 is obtained according to the current flowing through the start-up resistor 16211 and resistance of the start-up resistor 16211. When the output voltage is greater than the start-up voltage and the output power is greater than the start-up power, the control chip 16213 is started to control the auxiliary power supply 16 to start working, where a first auxiliary voltage generated at the first output terminal 181 is used as an operating voltage of the control chip 16213.

It is worth noting that parameters such as the resistance of the start-up resistor 16211, capacitance of the start-up capacitor 16212, and specification of the control chip 16213 can all be set according to an actual operating condition of the photovoltaic power generation system to which the auxiliary power supply 16 belongs, which is not limited by the embodiment.

Further, the start-up voltage may be determined according to the resistance of the start-up resistor 16211 and a start-up current threshold. The start-up current threshold is a start-up current threshold of a positive power supply (Vcc) of the control chip 16213 when the control chip 16213 is started. When the input current is greater than the start-up current threshold, the start-up voltage at the start-up terminal of the control chip 16213 is greater than the output voltage, the control chip 16213 is started to perform normal operation. In other words, the start-up current threshold is used to indicate the input current provided by the solar panel 11 to the control chip 16213 via the start-up resistor 16211 when the control chip 16213 is started. The specific value corresponding to the start-up current threshold is determined by the specification of the control chip 16213 selected in the actual operating condition.

For example, the start-up voltage ($U_{start-up}$) may be determined by the following Equation (1):

$$U_{start-up} = R_3 \times I_{th} \qquad (1)$$

where, $R_3$ represents the resistance of the start-up resistor 16211, and the specific value is determined by the actual operating condition, and $I_{th}$ is the start-up current threshold.

In the auxiliary power supply of the photovoltaic inverter provided in the embodiment of the present application, the voltage determining unit includes a start-up resistor, a start-up capacitor, and a control chip. Specifically, the first terminal of the start-up resistor is coupled to the positive terminal of the input terminal of the inverter circuit or the positive terminal of the input terminal of the photovoltaic inverter, and the second terminal of the start-up resistor is coupled to the start-up terminal of the control chip, the first output terminal of at least one output terminal and the first terminal of the start-up capacitor, the start-up terminal of the control chip is coupled to the first output terminal, and the second terminal of the start-up capacitor is grounded. In addition, the solar panel provides the input current for the control chip through the start-up resistor. On this basis, combined with the resistance of the start-up resistor, the output voltage of the solar panel can be obtained by Ohm's law. The start-up voltage of the start-up terminal of the control chip may be determined according to the start-up current threshold of the control chip and the resistance of the start-up resistor. The solar panel provides the input current to the control chip through the start-up resistor. When the input current is greater than the start-up current threshold of the control chip, the output voltage is greater than the start-up voltage, and the control chip is started to control the auxiliary power supply to start, so that the at least one output terminal of the conversion circuit outputs the corresponding auxiliary voltage.

Referring to FIG. 6, the power determining unit 1622 in the auxiliary power supply 16 of the photovoltaic inverter includes: a first resistor ($R_1$) 16221, a second resistor ($R_2$) 16222, and a first switch ($S_1$) 16223.

A first terminal of the first resistor 16221 is coupled to the first terminal of the start-up resistor 16211, and a second terminal of the first resistor 16221 is coupled to a first terminal of the first switch 16223, and a second terminal of the first switch 16223 is coupled to the negative terminal of the input terminal of the inverter circuit 14 or the negative terminal of the input terminal of the photovoltaic inverter, and a control terminal of the first switch 16223 is coupled to the first terminal of the start-up capacitor 16212 through the second resistor 16222.

The power determining unit 1622 includes the first resistor 16221, the second resistor 16222, and the first switch 16223. The first terminal of the first resistor 16221 is connected to the first terminal of the start-up resistor 16211 and the positive terminal of the input terminal of the inverter circuit 14 or the positive terminal of the input terminal of the photovoltaic inverter, and the second terminal of the first resistor 16221 is connected to the first terminal of the first switch 16223, and the second terminal of the first switch 16223 is directly coupled to the negative terminal of the input terminal of the inverter circuit 14 or the negative terminal of the input terminal of the photovoltaic inverter. The control terminal of the first switch 16223 is connected to the first terminal of the start-up capacitor 16212 through the second resistor 16222. The negative terminal of the input terminal of the inverter circuit 14 and the negative terminal of the input terminal of the photovoltaic inverter is connected to a ground terminal. For the connection states of the components in the power determining unit 1622 provided in the present embodiment, when the output power of the solar panel 11 is less than the start-up power, the voltage between the positive terminal and negative terminal of the input terminal of the inverter circuit 14 or the voltage between the positive terminal and the negative terminal of the input terminal of the photovoltaic inverter will be clamped to the turn-on threshold voltage of the first switch 16223. The voltage of the start-up capacitor 16212 is the turn-on threshold voltage of the first switch 16223. Therefore, when the voltage of the start-up capacitor 16223 is greater than the turn-on threshold voltage of the first switch 16223, the first switch 16223 can be turned on. The first switch 16223 may be a metal oxide semiconductor (MOS) field effect transistor, such as an insulated gate enhanced N-type MOS transistor.

It is worth noting that when the first switch 16223 is selected according to an actual operating condition, the turn-on threshold voltage of the selected first switch 16223 should be less than the start-up voltage of the start-up terminal of the control chip 16213.

Further, as the output power of the solar panel 11 increases, the auxiliary power supply 16 can be started normally when the output power reaches the start-up power of the auxiliary power supply 16. Therefore, the start-up power may be further determined according to the start-up voltage, the resistance of the first resistor 16221, and maximum instantaneous power when the auxiliary power supply 16 is started.

For example, the start-up power ($P_{start-up}$) may be determined by the following Equation (2):

$$P_{start-up} = \frac{U_{start-up}^2}{R_1} + P_{IC} \qquad (2)$$

where $R_1$ represents the resistance of the first resistor 16221, and a specific value thereof is set according to the actual operating condition, and $P_{IC}$ represents the maximum instantaneous power when the auxiliary power supply 16 is started, and a specific value thereof is determined by the specific specification of each component in the conversion circuit 162.

Figure 7:
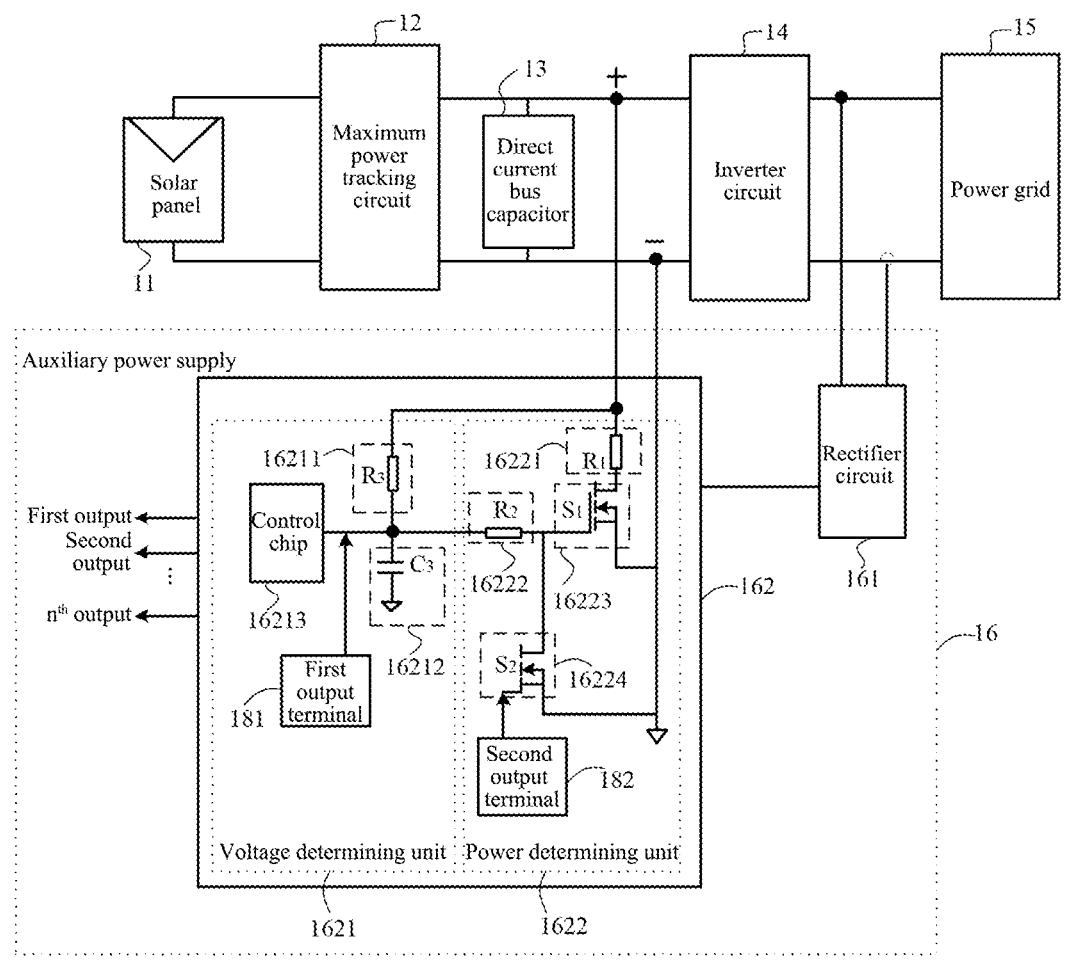
FIG. 7 is a schematic circuit diagram of another auxiliary power supply of a photovoltaic inverter provided in an embodiment of the present application.

When the output voltage of the solar panel 11 is greater than the start-up voltage and the output power is greater than the start-up power, the auxiliary power supply 16 starts to work, thereby avoiding repeated restarts due to objective reasons, so as to avoid repeated restarts of the photovoltaic inverter. The power determining unit 1622 includes a second switch 16224. FIG. 7 is a schematic circuit diagram of another auxiliary power supply of a photovoltaic inverter provided in an embodiment of the present application. As shown in FIG. 7, the power determining unit 1622 in the auxiliary power supply 16 of the photovoltaic inverter provided in the present embodiment further includes: the second switch ($S_2$) 16224.

A first terminal of the second switch 16224 is coupled to the control terminal of the first switch 16223, and a second terminal of the second switch 16224 is coupled to the negative terminal of the input terminal of the inverter circuit 14 or the negative terminal of the input terminal of the photovoltaic inverter.

A second output terminal 182 of the at least one output terminal of the conversion circuit 162 is coupled to a control terminal of the second switch 16224. When the output voltage is greater than the start-up voltage and the output power is greater than the start-up power, the second output terminal 182 generates a second auxiliary voltage which is used as a gate voltage of the second switch 16224, to control the second switch 16224 to be turned on. Specifically, when the auxiliary power supply 16 starts to work normally, the auxiliary power supply 16 generates the second auxiliary voltage through the second output terminal 182 to control the second switch 16224 to be turned on. At this time, the first resistor 16221 and the first switch 16223 are disconnected, so that the auxiliary power supply 16 is kept in the operating state, and then the photovoltaic inverter is started to work normally, and repeated restarts will not occur.

It can be understood that the second switch 16224 may be a MOS tube which is not limited in the embodiment of the present application.

The embodiment of the present application provides an auxiliary power supply of a photovoltaic inverter. The power determining unit includes the first resistor, the second resistor, and the first switch. The first terminal of the first resistor is coupled to the first terminal of the start-up resistor, and the second terminal of the first resistor is coupled to the first terminal of the first switch, and the second terminal of the first switch is coupled to the negative terminal of the input terminal of the inverter circuit or the negative terminal of the input terminal of the photovoltaic inverter, and the control terminal of the first switch is connected to the first terminal of the start-up capacitor through the second resistor. When the voltage of the start-up capacitor is greater than the turn-on threshold voltage of the first switch, the first switch is turned on. And the start-up power is determined according to the start-up voltage, the resistance of the first resistor, and the maximum instantaneous power when the auxiliary power supply is started. When the output voltage is greater than the start-up voltage and the output power is greater than the start-up power, the auxiliary power supply is controlled to start so that the at least one output terminal generates a corresponding auxiliary voltage. Further, the power determining unit further includes the second switch. The first terminal of the second switch is coupled to the control terminal of the first switch, and the second terminal of the second switch is coupled to the negative terminal of the input terminal of the inverter circuit or the negative terminal of the input terminal of the photovoltaic inverter. The second output terminal of the at least one output terminal is coupled to the control terminal of the second switch. When the output voltage is greater than the start-up voltage and the output power is greater than the start-up power, the second output terminal generates a second auxiliary voltage to control the second switch to be turned on, and the first resistor and the first switch are disconnected, and the auxiliary power supply keeps working, and then the photovoltaic inverter is stated to work normally without repeated restarts, which improves the reliability of the photovoltaic inverter.

Figure 8:
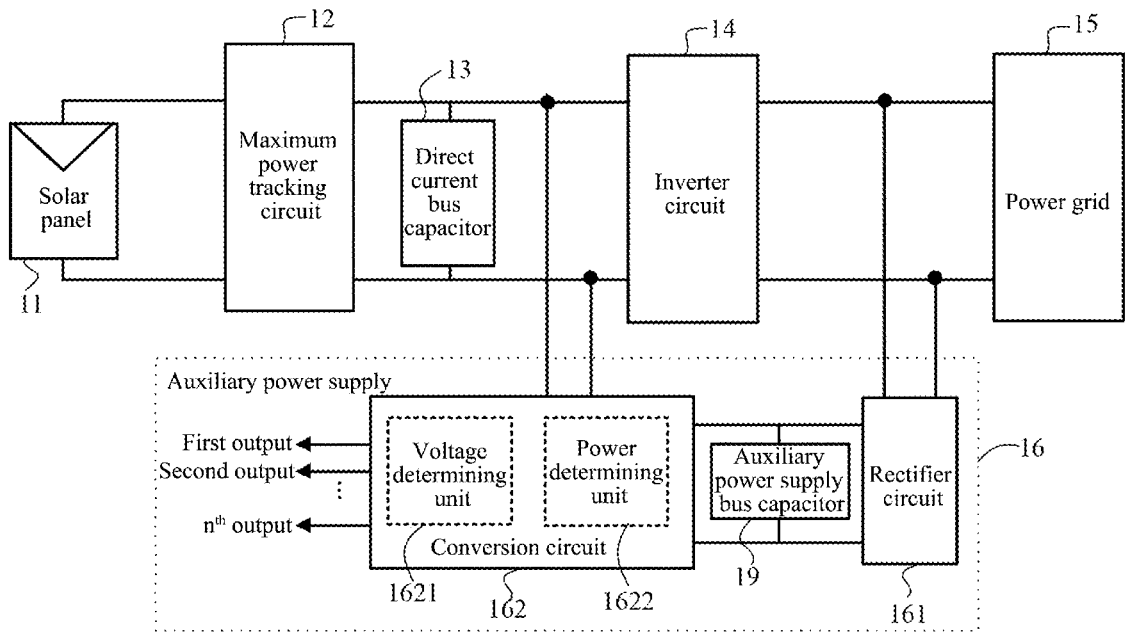
FIG. 8 is a schematic structural diagram of yet another auxiliary power supply of a photovoltaic inverter provided in an embodiment of the present application.

In an actual operating condition, in order to ensure the stable output of the auxiliary power supply during the low voltage ride through of the photovoltaic inverter, the auxiliary power supply may also include an auxiliary power supply bus capacitor. FIG. 8 is a schematic structural diagram of still another auxiliary power supply of a photovoltaic inverter provided in an embodiment of the present application. As shown in FIG. 8, the auxiliary power supply of the photovoltaic inverter provided in the present embodiment further includes an auxiliary power supply bus capacitor 19.

Referring to FIG. 8, the auxiliary power supply bus capacitor 19 is connected between the rectifier circuit 161 and the input terminal of the conversion circuit 162.

The selection of the capacitance of the auxiliary power supply bus capacitor 19 needs to meet the following Equation (3):

$$\frac{1}{2} \times C_2 \times (U_{nom}^2 - U_{min}^2) \geq \frac{P_{out}}{\eta} \times T_{LVRT} \quad (3)$$

where, $C_2$ is the capacitance of the auxiliary power supply bus capacitor 19, and $U_{min}$ is a minimum direct current bus voltage when the auxiliary power supply 16 is working, and $U_{nom}$ is a direct current bus voltage of the auxiliary power supply corresponding to a rated voltage of the power grid, and $P_{out}$ is the output power of the auxiliary power supply 16 when the photovoltaic inverter works stably, and η is a lowest conversion rate of the auxiliary power supply 16, and $T_{LVRT}$ is duration of the low voltage ride through.

Since the smaller the output power $P_{out}$ of the auxiliary power supply 16 is, the higher the conversion rate is, the capacitance of the auxiliary power supply bus capacitor 19 is usually hundreds of microfarads, and an electrolytic capacitor with high energy density may be used as the auxiliary power supply bus capacitor 19 to reduce hardware costs and volume.

The auxiliary power supply of the photovoltaic inverter provided in the embodiment of the present application further includes the auxiliary power supply bus capacitor, where the auxiliary power supply bus capacitor is connected between the rectifier circuit and the input terminal of the conversion circuit. Based on the fact that the smaller the output power, the higher the conversion rate, the capacitance of the auxiliary power supply bus capacitor is required to meet the above Equation (3), so that in the low voltage ride through condition, the stable output of the auxiliary power supply is maintained through limitedly increasing the capacitance of the auxiliary power supply bus capacitor, which does not affect the power density of the photovoltaic inverter.

It should be noted that the components involved in the auxiliary power supply and the connections between the components in the above embodiments are only shown as examples, and other alternative circuits may also be adopted in the case of achieving the same effect.

Figure 9:
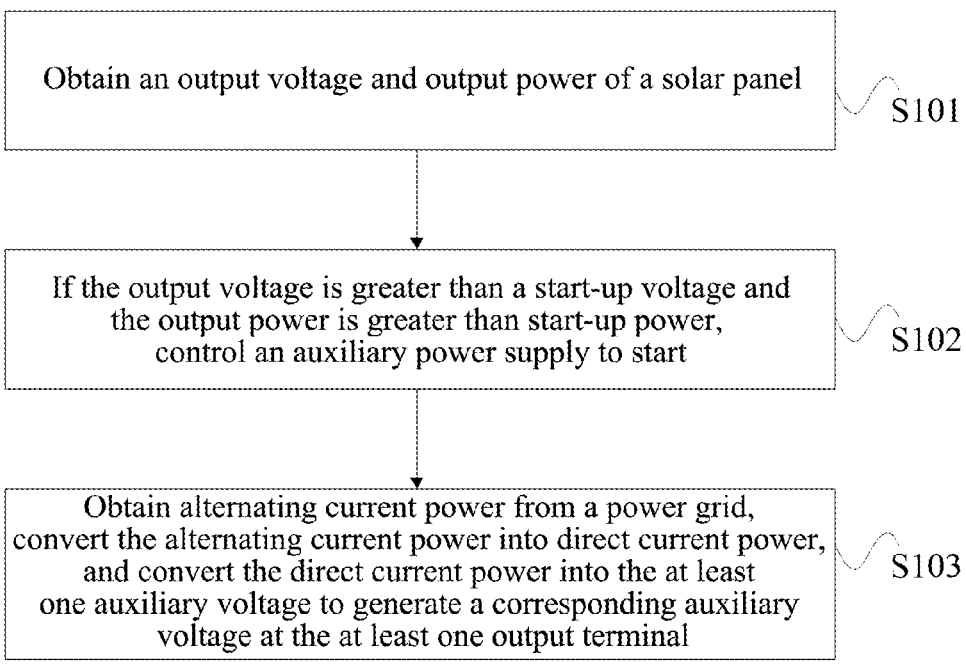
FIG. 9 is a schematic flowchart of a control method provided in an embodiment of the present application.

FIG. 9 is a schematic flowchart of a control method provided in an embodiment of the present application. As shown in FIG. 9, the control method provided in the present embodiment includes:

S101: obtain an output voltage and output power of a solar panel;

S102: if the output voltage is greater than a start-up voltage and the output power is greater than start-up power, control an auxiliary power supply to start;

S103: obtain alternating current power from a power grid, convert the alternating current power into direct current power, and convert the direct current power into at least one auxiliary voltage, so that a corresponding auxiliary voltage is generated at the at least one output terminal.

The control method provided in the present embodiment is applied to the auxiliary power supply of the photovoltaic inverter in the foregoing embodiments, where the auxiliary power supply includes a rectifier circuit and a conversion circuit with at least one output terminal. The conversion circuit includes a voltage determining unit and a power determining unit. The input terminal of the rectifier circuit is coupled to the power grid, and the conversion circuit is coupled to the output terminal of the rectifier circuit.

The control process is as follows. The output voltage and output power of the solar panel are obtained. When the output voltage is greater than the start-up voltage and the output power is greater than the start-up power, the auxiliary power supply is controlled to start. In addition, the alternating current power of the power grid is obtained and the alternating current power is converted to into direct current power, and the direct current power is converted into at least one auxiliary voltage, so that a corresponding auxiliary voltage is generated at the at least one output terminal, and then the photovoltaic inverter is started. It should be noted that the foregoing control process does not limit the execution sequence of the foregoing steps.

On another aspect, when the output voltage is greater than the start-up voltage and the output power is greater than the start-up power, the auxiliary power supply is turned on, and then the photovoltaic inverter is turned on. Therefore, in the auxiliary power supply of the photovoltaic inverter applying the control method provided in the present embodiment, there is no need to add an additional control circuit, the repeated restarts of the auxiliary power supply can be avoided during the day when the solar panel power is insufficient, and the reliability of the photovoltaic inverter is improved, while the losses of the photovoltaic inverter is reduced at night.

In a possible design, the voltage determining unit includes a start-up resistor, a start-up capacitor, and a control chip.

A first terminal of the start-up resistor is coupled to a positive terminal of the input terminal of the inverter circuit or a positive terminal of the input terminal of the photovoltaic inverter, and a second terminal of the start-up resistor is coupled to a start-up terminal of the control chip, a first output terminal of the at least one output terminal and a first terminal of the start-up capacitor to provide an operating voltage for the control chip through the first output terminal. In addition, a second terminal of the start-up capacitor is grounded.

Therefore, obtaining the output voltage and the output power of the solar panel may include:
providing, by the solar panel, an input current to the control chip through the start-up resistor, so that the voltage determining unit obtains the output voltage.

The start-up voltage may be determined according to resistance of the start-up resistor and a start-up current threshold. The start-up current threshold refers to a current threshold required when the control chip can be started. In other words, the start-up current threshold can represent the input current flowing through the start-up resistor when the control chip is started, that is, when the control chip is in a start-up state.

In a possible design, the power determining unit includes: a first resistor, a second resistor, and a first switch.

A first terminal of the first resistor is coupled to the first terminal of the start-up resistor, a second terminal of the first resistor is coupled to the first terminal of the first switch, and a second terminal of the first switch is coupled to the negative terminal of the input terminal of the inverter circuit or the negative terminal of the input terminal of the photovoltaic inverter, and a control terminal of the first switch is connected to the first terminal of the start-up capacitor through the second resistor.

Therefore, when a voltage of the start-up capacitor is greater than a turn-on threshold voltage of the first switch, the first switch is controlled to be turned on, so that a voltage across the first resistor is equal to a voltage between the positive terminal and the negative terminal of the input terminal of the inverter circuit or the voltage between the positive terminal and the negative terminal of the input terminal of the photovoltaic inverter, and the power determining unit obtains the output power. The turn-on threshold voltage is less than the start-up voltage of the start-up terminal of the control chip.

Further, a possible implementation for determining the start-up power may include:
determining the start-up power according to the start-up voltage, resistance of the first resistor, and maximum instantaneous power when the auxiliary power supply is started.

When the output voltage of the solar panel is greater than the start-up voltage and the output power is greater than the start-up power, after the auxiliary power supply starts to work, in order to avoid the repeated restarts due to objective reasons to avoid the repeated restarts of the photovoltaic inverter, a corresponding control operation may be performed through a second switch provided in the power determining unit, so that the photovoltaic inverter is turned on to work and repeated restarts will not occur.

A first terminal of the second switch is coupled to the control terminal of the first switch, and a second terminal of the second switch is coupled to the negative terminal of the input terminal of the inverter circuit or the negative terminal of the input terminal of the photovoltaic inverter.

A second output terminal of the at least one output terminal is coupled to a control terminal of the second switch to generate a second auxiliary voltage at the second output terminal to provide a gate voltage to the gate of the second switch.

When the output voltage is greater than the start-up voltage and the output power is greater than the start-up power, the control chip is controlled to start to control the auxiliary power supply to start to work. A first auxiliary voltage is generated at the first output terminal voltage to provide the control chip with an operating voltage, and a second auxiliary voltage is generated at the second output terminal to control the second switch to be turned on. Due to the conduction of the second switch, the first resistor and the first switch will be disconnected, so that the auxiliary power supply is kept in an operating state to start the photovoltaic inverter to work normally, and repeated restarts will not occur.

Further, in order to ensure the stable output of the auxiliary power supply in a low voltage ride through condition, the auxiliary power supply further includes an auxiliary power supply bus capacitor which is connected between the rectifier circuit and the input terminal of the conversion circuit, where the capacitance of the auxiliary power supply bus capacitor may be determined according to the aforementioned Equation (3), and the involved principles and effects are similar to the aforementioned contents, which will not be repeated here.

Optionally, the power grid in the foregoing method embodiment may be a single-phase power grid, where the rectifier circuit is coupled to two input terminals of the single-phase power grid.

Optionally, the power grid in the foregoing method embodiment may be a three-phase power grid, where the rectifier circuit is coupled between the live lines and/or the zero line of the three-phase power grid. For example, the rectifier circuit is coupled to three live lines of the three-phase power grid, or the rectifier circuit is coupled to two live lines of the three-phase power grid, or the rectifier circuit is coupled between a live line and the zero line of the three-phase power grid.

It is worth noting that the control method provided in the above-mentioned embodiment can be used to execute corresponding steps of the auxiliary power supply of the photovoltaic inverter provided in the above-mentioned embodiment. The specific implementation mode, principle and technical effect are similar to those of the previous embodiments, which will not be repeated here.

Those skilled in the art will easily think of other embodiments of the present application after considering the specification and practicing the application disclosed herein. The present application is intended to cover any variations, uses, or adaptive changes of the present application. These variations, uses, or adaptive changes follow the general principles of the present application and include common knowledge or conventional technical means in the technical field not disclosed in the present application. The description and embodiments are only regarded as illustrative, and the true scope and spirit of the application are indicated by the claims.

It should be understood that the present application is not limited to the precise structure that has been described above and shown in the accompanying drawings, and various modifications and changes can be made without departing from its scope. The scope of the present application is only limited by the appended claims.

What is claimed is:

1. An auxiliary power supply of a photovoltaic inverter, comprising: a rectifier circuit and a conversion circuit with at least one output terminal, wherein the conversion circuit comprises a voltage determining unit and a power determining unit;
   an input terminal of the rectifier circuit is coupled to a power grid, and the rectifier circuit is configured to convert alternating current power of the power grid into direct current power;
   the conversion circuit is coupled to an output terminal of the rectifier circuit, and is configured to convert the direct current power into at least one auxiliary voltage;
   the power determining unit is coupled to an input terminal of the photovoltaic inverter or an input terminal of an inverter circuit of the photovoltaic inverter, and is configured to obtain output power of a solar panel; the voltage determining unit is coupled to the input terminal of the photovoltaic inverter or the input terminal of the inverter circuit of the photovoltaic inverter, and is configured to obtain an output voltage of the solar panel; wherein, when the output voltage is greater than a start-up voltage and the output power is greater than start-up power, the auxiliary power supply is started to generate a corresponding auxiliary voltage at the at least one output terminal;
   wherein the voltage determining unit comprises: a start-up resistor, a start-up capacitor and a control chip;
   a first terminal of the start-up resistor is coupled to a positive terminal of the input terminal of the inverter circuit or a positive terminal of the input terminal of the photovoltaic inverter, and a second terminal of the start-up resistor is coupled to a start-up terminal of the control chip, a first output terminal of the at least one output terminal and a first terminal of the start-up capacitor, respectively, and a second terminal of the start-up capacitor is grounded;
   the solar panel provides an input current to the control chip via the start-up resistor, so that the voltage determining unit obtains the output voltage;
   wherein when the output voltage is greater than the start-up voltage and the output power is greater than the start-up power, the control chip is started to control the auxiliary power supply to start, and a first auxiliary voltage is generated at the first output terminal to provide an operating voltage for the control chip.

2. The auxiliary power supply of the photovoltaic inverter according to claim 1, wherein the start-up voltage is determined according to resistance of the start-up resistor and a start-up current threshold, and the start-up current threshold is configured to represent the input current when the control chip is started.

3. The auxiliary power supply of the photovoltaic inverter according to claim 1, wherein the power determining unit comprises: a first resistor, a second resistor, and a first switch;
   a first terminal of the first resistor is coupled to the first terminal of the start-up resistor, and a second terminal of the first resistor is coupled to a first terminal of the first switch, and a second terminal of the first switch is coupled to a negative terminal of the input terminal of the inverter circuit or a negative terminal of the input terminal of the photovoltaic inverter, and a control terminal of the first switch is connected to the first terminal of the start-up capacitor through the second resistor.

4. The auxiliary power supply of the photovoltaic inverter according to claim 3, wherein when a voltage of the start-up capacitor is greater than a turn-on threshold voltage of the first switch, the first switch is turned on, and a voltage across the first resistor is equal to a voltage between the positive terminal and the negative terminal of the input terminal of the photovoltaic inverter or a voltage between the positive terminal and the negative terminal of the input terminal of the inverter circuit, so that the power determining unit obtains the output power.

5. The auxiliary power supply of the photovoltaic inverter according to claim 4, wherein the turn-on threshold voltage is less than the start-up voltage.

6. The auxiliary power supply of the photovoltaic inverter according to claim 4, wherein the start-up power is determined according to the start-up voltage, resistance of the first resistor, and maximum instantaneous power when the auxiliary power supply is started.

7. The auxiliary power supply of the photovoltaic inverter according to claim 3, wherein the power determining unit further comprises a second switch;
   a first terminal of the second switch is coupled to the control terminal of the first switch, and a second terminal of the second switch is coupled to the negative terminal of the input terminal of the inverter circuit or the negative terminal of the input terminal of the photovoltaic inverter;
   a second output terminal of the at least one output terminal is coupled to a control terminal of the second switch;
   when the output voltage is greater than the start-up voltage and the output power is greater than the start-up power, a second auxiliary voltage is generated at the second output terminal to control the second switch to be turned on.

8. The auxiliary power supply of the photovoltaic inverter according to claim 1, wherein the power grid is a single-phase power grid, and the rectifier circuit is coupled to two input terminals of the single-phase power grid.

9. The auxiliary power supply of the photovoltaic inverter according to claim 1, wherein the power grid is a three-phase power grid, and the rectifier circuit is coupled between live lines and/or a zero line of the three-phase power grid.

10. The auxiliary power supply of the photovoltaic inverter according to claim 1, wherein the auxiliary power supply further comprises: an auxiliary power supply bus capacitor;
    the auxiliary power supply bus capacitor is connected between the rectifier circuit and an input terminal of the conversion circuit.

11. The auxiliary power supply of the photovoltaic inverter according to claim 10, wherein capacitance of the auxiliary power supply bus capacitor satisfies the following equation:

$$\frac{1}{2} \times C_2 \times (U_{nom}^2 - U_{min}^2) \geq \frac{P_{out}}{\eta} \times T_{LVRT}$$

wherein $C_2$ is the capacitance of the auxiliary power supply bus capacitor, $U_{min}$ is a minimum direct current bus voltage when the auxiliary power supply is working, $U_{nom}$ is a direct current bus voltage of the auxiliary power supply corresponding to a rated voltage of the power grid, and $P_{out}$ is output power of the auxiliary power supply when the photovoltaic inverter is in stable operation, η is a lowest conversion rate of the auxiliary power supply, and $T_{LVRT}$ is duration of low voltage ride through.

12. A photovoltaic power generation system, comprising: at least one solar panel, a maximum power tracking circuit, a direct current bus capacitor, an inverter circuit, a power grid, and the auxiliary power supply of the photovoltaic inverter according to claim 1;
   an output terminal of the at least one solar panel is coupled to an input terminal of the maximum power tracking circuit, and an output terminal of the maximum power tracking circuit is coupled to the direct current bus capacitor, and the direct current bus capacitor is coupled between a positive terminal and a negative terminal of an input terminal of the inverter circuit through a positive direct current bus and a negative direct current bus, and an output terminal of the inverter circuit is coupled to the power grid, and the auxiliary power supply is coupled to an input terminal of the power grid and the input terminal of the inverter circuit, respectively, or the auxiliary power supply is coupled to the input terminal of the power grid and the input terminal of the maximum power tracking circuit, respectively.

13. A control method, applied to an auxiliary power supply of a photovoltaic inverter, wherein the auxiliary power supply comprises a rectifier circuit and a conversion circuit with at least one output terminal; the conversion circuit comprises a voltage determining unit and a power determining unit; an input terminal of the rectifier circuit is coupled to a power grid; the conversion circuit is coupled to an output terminal of the rectifier circuit, and the voltage determining unit is coupled to an input terminal of the photovoltaic inverter or an input terminal of an inverter circuit of the photovoltaic inverter, and the power determining unit is coupled to the input terminal of the photovoltaic inverter or the input terminal of the inverter circuit of the photovoltaic inverter; wherein the method comprises:
   obtaining an output voltage and output power of a solar panel;
   if the output voltage is greater than a start-up voltage and the output power is greater than a start-up power, controlling the auxiliary power supply to start;
   obtaining alternating current power from the power grid and converting the alternating current power to direct current power; and
   converting the direct current power into at least one auxiliary voltage, to generate a corresponding auxiliary voltage at the at least one output terminal;
   wherein the voltage determining unit comprises: a start-up resistor, a start-up capacitor, and a control chip; a first terminal of the start-up resistor is coupled to a positive terminal of the input terminal of the inverter circuit or a positive terminal of the input terminal of the photovoltaic inverter, and a second terminal of the start-up resistor is coupled to a start-up terminal of the control chip, a first output terminal of the at least one output terminal and a first terminal of the start-up capacitor, and a second terminal of the start-up capacitor is grounded;
   the obtaining an output voltage and output power of a solar panel comprises: providing, by the solar panel, an input current to the control chip through the start-up resistor, so that the voltage determining unit obtains the output voltage;
   wherein when the output voltage is greater than the start-up voltage and the output power is greater than the start-up power, the control chip is started to control the auxiliary power supply to start, and a first auxiliary voltage is generated at the first output terminal to provide an operating voltage for the control chip.

14. The control method according to claim 13, wherein the start-up voltage is determined according to resistance of the start-up resistor and a start-up current threshold, and the start-up current threshold is configured to represent the input current when the control chip is started.

15. The control method according to claim 13, wherein the power determining unit comprises: a first resistor, a second resistor, and a first switch;
   a first terminal of the first resistor is coupled to the first terminal of the start-up resistor, and a second terminal of the first resistor is coupled to a first terminal of the first switch, and a second terminal of the first switch is coupled to a negative terminal of the input terminal of the inverter circuit or a negative terminal of the input terminal of the photovoltaic inverter, and a control terminal of the first switch is connected to the first terminal of the start-up capacitor through the second resistor; the method further comprises:
   when a voltage of the start-up capacitor is greater than a turn-on threshold voltage of the first switch, controlling the first switch to be turned on and a voltage across the first resistor to be equal to a voltage between the positive terminal and the negative terminal of the input terminal of the inverter circuit, or a voltage between the positive terminal and the negative terminal of the input terminal of the photovoltaic inverter, so that the power determining unit obtains the output power, wherein the turn-on threshold voltage is less than the start-up voltage.

16. The control method according to claim 15, wherein the start-up power is determined according to the start-up voltage, resistance of the first resistor, and maximum instantaneous power when the auxiliary power supply is started.

17. The control method according to claim 16, wherein the power determining unit further comprises a second switch;
   a first terminal of the second switch is coupled to the control terminal of the first switch, and a second terminal of the second switch is coupled to the negative terminal of the input terminal of the inverter circuit or the negative terminal of the input terminal of the photovoltaic inverter;
   a second output terminal of the at least one output terminal is coupled to a control terminal of the second switch;
   the method further comprises:
   when the output voltage is greater than the start-up voltage and the output power is greater than the start-up power, controlling the control chip to start to control the auxiliary power supply to start, and generating a first auxiliary voltage at the first output terminal to provide an operating voltage for the control chip, and generating a second auxiliary voltage at the second output terminal to control the second switch to be turned on.

* * * * *